United States Patent
Hasegawa

(10) Patent No.: US 7,225,185 B2
(45) Date of Patent: May 29, 2007

(54) ORIGINALITY GUARANTEE SYSTEM, EMBEDDED INFORMATION/ALTERATION DETECTION APPARATUS AND EMBEDDED INFORMATION/ALTERATION DETECTION METHOD, AND RECORD MEDIUM STORING EMBEDDED INFORMATION/ALTERATION DETECTION PROGRAM THEREIN

(75) Inventor: Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 471 days.

(21) Appl. No.: 10/807,392

(22) Filed: Mar. 24, 2004

(65) Prior Publication Data

US 2004/0255125 A1    Dec. 16, 2004

(30) Foreign Application Priority Data

Mar. 26, 2003    (JP) .............................. 2003-085547

(51) Int. Cl.
    *G06F 7/00*    (2006.01)
(52) U.S. Cl. .......................................... 707/3; 707/10
(58) Field of Classification Search ................ 707/1–7, 707/101
    See application file for complete search history.

(56) References Cited

U.S. PATENT DOCUMENTS

| | | | |
|---|---|---|---|
| 5,990,810 A | 11/1999 | Williams | |
| 6,567,917 B1 | 5/2003 | Ziese | |
| 6,907,414 B1 * | 6/2005 | Parnell | ........................ 706/47 |
| 2002/0158865 A1 | 10/2002 | Dye et al. | |
| 2002/0199106 A1 | 12/2002 | Hayashi | |
| 2003/0050924 A1 * | 3/2003 | Faybishenko et al. | ......... 707/3 |

FOREIGN PATENT DOCUMENTS

| | | |
|---|---|---|
| CN | 1373609 | 10/2002 |
| EP | 0 953 938 | 11/1999 |
| JP | A 10-334272 | 12/1998 |
| JP | A 2000-82156 | 3/2000 |

* cited by examiner

*Primary Examiner*—Wilson Lee
(74) *Attorney, Agent, or Firm*—Oliff & Berridge, PLC

(57) ABSTRACT

To provide an embedded information/alteration detection apparatus as well as an embedded information/alteration detection method, and a computer-readable record medium storing an embedded information/alteration detection program therein, which can embed and read out information without any change in the "significance" and "quality" of represented data. In an embedded information apparatus, a plurality of structural data are sorted on the basis of a first rule, a message digest is calculated for a sorted result, and the sorted result is further sorted on the basis of a second rule that is different from the first rule by using a calculated result as a key. In an information alteration detection apparatus, a plurality of structural data are sorted on the basis of a first rule, a message digest is calculated for a sorted result, and the sorted result is further sorted on the basis of a second rule by using a calculated result as a key. The sorted result, and the data before being sorted on the basis of the first rule are compared. If they agree, the absence of any alteration is decided, and if they do not agree, the presence of any alteration is decided.

4 Claims, 4 Drawing Sheets

··· EXAMPLE OF VRML......
VRML V1.0ascii
Coordinate3 {
    point [
        020,
        -101,
        101,
        10-1,
        -10-1,
        0-20
    ]
}
IndexcdFaceSet {
    coordIndex [
        0.1,2,-1.
        0.2,3,·1,
        0.3,4,-1.
        0,4,1,·1,
        5.1,2,-1,
        5,2,3,-1,
        5,3,4,-1.
        5,4.1,·1
    ]
}

FIG. 2

··· EXAMPLE OF RAW TRIANGLE......
1. 0 -1. 1 0. 8
3. 5 2. 7 6. 5
4. 8 -2. 1 3. 3
-1. 2 2. 1 -0. 9
   5. 3 -1. 1 -2. 8
4. 1 1. 1 -0. 9

ORIGINALITY GUARANTEE SYSTEM, EMBEDDED INFORMATION/ALTERATION DETECTION APPARATUS AND EMBEDDED INFORMATION/ALTERATION DETECTION METHOD, AND RECORD MEDIUM STORING EMBEDDED INFORMATION/ALTERATION DETECTION PROGRAM THEREIN

BACKGROUND OF THE INVENTION

1. Field of Invention

The present invention relates to an embedded information/alteration detection apparatus as well as an embedded information/alteration detection method, and a computer-readable record medium storing an embedded information/alteration detection program therein, which embeds information by chiefly utilizing redundancy existent concerning the description method of a data structure, in order to detect the alteration or the legitimacy of the data. More particularly, the invention relates to data hiding technology which embeds information into data describing a three-dimensional shape, such as three-dimensional design data generated in such, as three-dimensional graphics and CAD. The invention also relates to a technology which detects the alteration or legitimacy of the data of a three-dimensional shape composed as the combination of primitive geometric shapes, such as a polyhedron and a body of revolution.

2. Description of Related Art

Heretofore, digital watermark technology and data hiding technology as described below have been known in the related art.

JP-A-10-334272 for example, contains a technique wherein information is embedded by changing the geometry parameters of a three-dimensional shape model.

Specifically, the related-art technique adopts a method wherein various information items are embedded into the three-dimensional shape model in a visible or invisible state by changing the geometry parameters of the three-dimensional shape model, namely, a description to define a geometric shape.

The three-dimensional shape model being a subject for embedding is usually composed of its primitives (constituents) that are polyhedrons, straight lines, sets of points, or curved surfaces. Each of the primitives is defined by geometry parameters. Accordingly, the three-dimensional shape model has its whole geometric shape defined by the set of a large number of geometry parameters.

As stated in the related-art technique, therefore, the information is embedded by changing the geometry parameters of a plurality of primitives which constitute the three-dimensional shape model.

It is also described in the related-art technique that the information is embedded by dividing the geometry parameters into numerical parameters and phases and then changing the respective divisions, and that the embedded information is conversely extracted by detecting the changed geometry parameters.

Further, JP-A-2000-82156 contains a technique wherein the data of a three-dimensional shape model is submitted to a wavelet transform, and information is embedded into the result of the transform.

Specifically, according to this related-art example, three-dimensional shape transformation means performs wavelets transformation on the data of an original model $V^0$ and digital watermark embedding means embeds watermark data into a WT factor vector generated by the wavelet transformation. Inverse transformation means of a three-dimensional shape creates the data of a three-dimensional shape model (distribution model $V'^0$) in which the watermark data is embedded, on the basis of the WT factor vector.

Thus, according to the related-art technique, in a case where the data of digital information, including copyright information,etc., is embedded into three-dimensional shape data, the error control can be performed in consideration of the visual change of the three-dimensional shape model in which the digital information data is embedded. A robust digital information data embedding method is described even when the shape model is deleted or deformed.

SUMMARY OF THE INVENTION

As design requirements for digital watermark technology or data hiding technology, the following is mentioned:

Watermark information does not degenerate or disappear due to any of various processes, such as editing, compression and transmission.

The deterioration of contents attendant upon the embedding watermark information is minimum.

Watermark information is dispersed over the whole region of the contents without being arranged only on a header portion or a specified region.

The technology is immune against any malicious attack, such as the alteration or elimination of an digital watermark.

Embedding/detecting watermark information is easy, and the embedded watermark time required is short.

Regarding the requirements, the related-art technique described in the JP-A-10-334272 is problematic in that the original geometric data must be changed in order to embed the information and that an algorithm to detect the watermark information becomes complicated.

The related-art technique described in the JP-A-2000-82156 features that the wavelet transform is performed as a concrete operating method. But it is problematic in that the resulting data that is embedded with the information differs from the original data.

The present invention has been made considering such circumstances, and provides an embedded information/alteration detection apparatus as well as an embedded information/alteration detection method, and a computer-readable record medium storing an embedded information/alteration detection program therein, which can embed and read out information without any change in the "significance" and "quality" of represented data.

The present invention has been made to accomplish the above. An aspect of the present invention includes an originality guarantee system having an embedded information apparatus which embeds information into a plurality of structural data and an information alteration detection apparatus which detects any alteration of the plurality of structural data with the information embedded therein by the embedded information apparatus. The embedded information apparatus includes a data standardization device that sorts the plurality of structural data on the basis of a first rule, a message digest generation device that calculates a message digest with a predetermined hash function, for a bit stream composed of the plurality of structural data sorted by said data standardization means; a data transformation device that sorts the plurality of structural data sorted by said data standardization device, on the basis of a second rule that is different from the first rule, with a key being the message digest calculated by said message digest generation device.

The information alteration detection apparatus includes a data standardization device that sorts a plurality of structural data on the basis of the first rule, a message digest generation device to calculate a message digest with the hash function, for a bit stream composed of the plurality of structural data sorted by said data standardization device, a data transformation device that sorts the plurality of structural data sorted by said data standardization device, on the basis of the second rule, with a key being the message digest calculated by said message digest generation device, and a decision device that compares the plurality of structural data, which is sorted by said data transformation device, with the plurality of structural data before being sorted by said data standardization device. The decision device decides that the plurality of structural data, before being sorted by said data standardization device, have not been altered, when both of the structural data match. The decision device also decides that the plurality of structural data before being sorted by said data standardization device, have been altered, when both of the structural data do not match.

An aspect of the present invention includes a data standardization device that sorts a plurality of structural data on the basis of a predetermined rule, a message digest generation device that calculates a message digest with a predetermined hash function, for a bit stream composed of the plurality of structural data sorted by said data standardization device, and a data transformation device that sorts the plurality of structural data sorted by said data standardization device, on the basis of a rule that is different from the first-mentioned rule, with a key being the message digest calculated by said message digest generation device.

An aspect of the present invention also includes a data standardization device that sorts a plurality of structural data on the basis of a first rule that is the same as that of a data standardization device of an embedded information apparatus, a message digest generation device that calculates a message digest with a predetermined hash function, for a bit stream composed of the plurality of structural data sorted by said data standardization device, a data transformation device that sorts the plurality of structural data sorted by said data standardization device, on the basis of a rule being that is different from the first rule and being the same as that of data transformation device of the embedded information apparatus, with a key being the message digest calculated by said message digest generation device, and decision device that compares the plurality of structural data, which is sorted by said data transformation device, with the plurality of structural data before being sorted by said data standardization device, and that decides that the plurality of structural data, before being sorted by said data standardization device, have not been altered, when both of the structural data match, and that decides that the plurality of structural data, before being sorted by said data standardization device, have been altered, when both of the structural data do not match.

In an aspect of the present invention, a plurality of structural data is sorted on the basis of a first rule. A message digest with a predetermined hash function, for a bit stream composed of the plurality of sorted structural data is calculated. The plurality of sorted structural data is sorted on the basis of a second rule, that is different from the first rule, by using the calculated message digest as a key.

In an aspect of the present invention, a plurality of structural data is sorted on the basis of a first rule in an embedded information method. A message digest with a predetermined hash function, for a bit stream composed of the plurality of sorted structural data is calculated. The plurality of sorted structural data is sorted on the basis of a second rule in the embedded information method by using the calculated message digest as a key. The plurality of structural data, sorted on the basis of the second rule, is compared with the plurality of structural data, before being sorted on the basis of the first rule. It is determined that the plurality of structural data, before being sorted on the basis of the first rule, has not been altered, when both of the structural data match. It is also determined that the plurality of structural data, before being sorted on the basis of the first rule, has been altered, when both of the structural data do not match.

In addition, an aspect of the present invention includes a computer-readable record medium that stores and executes an embedded information program on a computer and steps as follows. A plurality of structural data on the basis of a first rule is stored. A message digest with a predetermined hash function, for a bit stream composed of the plurality of sorted structural data is calculated. The plurality of sorted structural data is sorted on the basis of a second rule, that is different from the first rule, by using the calculated message digest as a key.

An aspect of the present invention also has a computer-readable record medium that stores and executes an information alteration detection program on a computer as follows. A plurality of structural data is sorted on the basis of a first rule in the sorting process in which the computer executes an embedded information program. A message digest, with a predetermined hash function, is calculated, for a bit stream composed of the plurality of sorted structural data. The plurality of sorted structural data is sorted on the basis of a second rule in the embedded information method by using the calculated message digest as a key. The plurality of structural data, which is sorted on the basis of the second rule, is compared with the plurality of structural data, before being sorted on the basis of the first rule. It is determined that the plurality of structural data, before being sorted on the basis of the first rule, have not been altered, when both of the structural data match. It is also determined that the plurality of structural data, before being sorted on the basis of the first rule, have been altered, when both of the data do not match.

BRIEF DESCRIPTION OF THE DRAWINGS

FIG. 2 is a schematic showing an example of the VRML format of a sexangular polygon which is described by an xyz-coordinate system;

FIG. 3 is a schematic showing an example of the Raw Triangle format of triangles which are described by an xyz-coordinate system;

DETAILED DESCRIPTION OF EXEMPLARY EMBODIMENTS

A first exemplary embodiment of a guarantee system of data originality to which an embedded information/alteration detection apparatus of an aspect of the present invention is applied will be described with reference to the drawings. The guarantee system of data originality in this exemplary embodiment includes an embedded information apparatus which embeds information into a plurality of structural data (to be described later), and an information alteration detection apparatus which detects any alteration of the plurality of structural data into which the embedded information apparatus has embedded the information.

Figure 1:
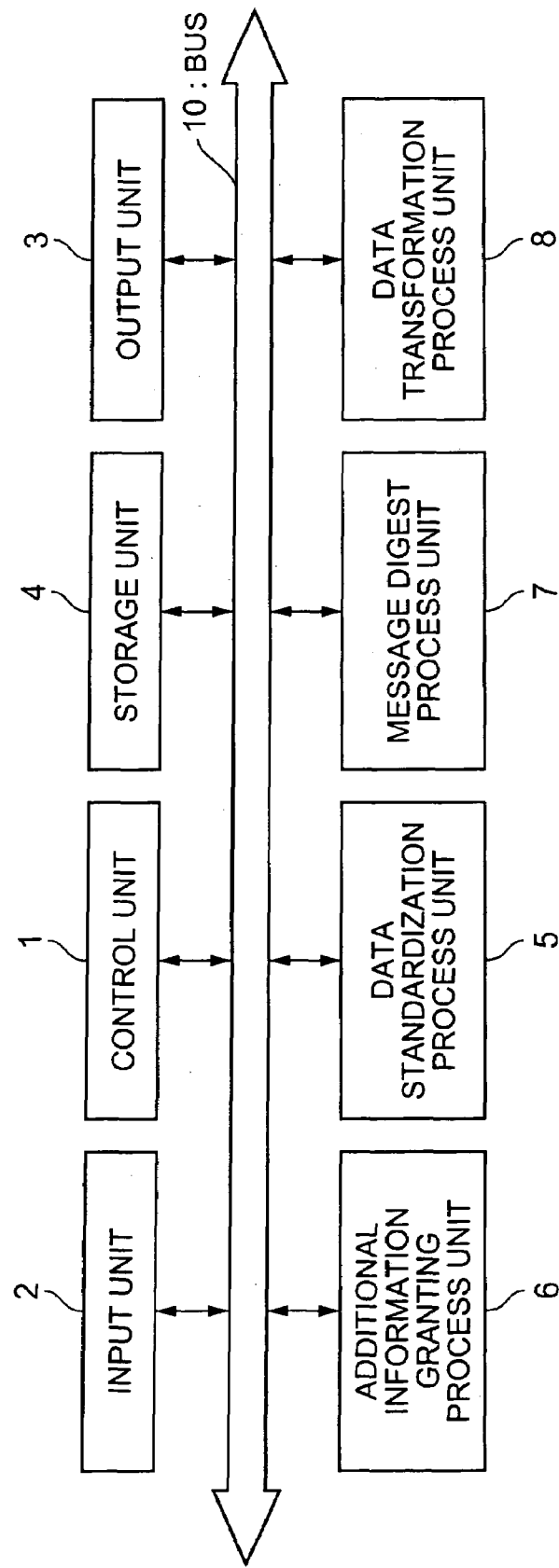
FIG. 1 is a block schematic showing the construction of an embedded information apparatus in an exemplary embodiment.

FIG. 1 is a block schematic showing the construction of the embedded information apparatus in this exemplary embodiment.

The embedded information apparatus in this exemplary embodiment is so constructed that a control unit 1, an input unit 2, an output unit 3, a storage unit 4, a data standardization process unit 5, an additional information granting process unit 6, a message digest process unit 7, and a data transformation process unit 8 are interconnected by a bus 10.

The control unit 1 controls data input/output in the input unit 2, the output unit 3, the storage unit 4, the data standardization process unit 5, the additional information granting process unit 6, the message digest process unit 7 and the data transformation process unit 8.

The input unit 2 is an interface unit that accepts the input of an object, which is a subject to embed watermark information and is composed of a plurality of structural data.

Here, the "structural data" are data which have a data structure described by one or more parameters, and which can be sequenced by the parameter values. Concretely, the "structural data" are, for example, voice data in a format in which data are held in a plurality of divided blocks, two-dimensional image data in a format in which the description data of a pattern shape or the like are held in a plurality of divided blocks, or dynamic image data in a format in which three-dimensional image data, voice data and image data are held in a plurality of divided blocks. The data structure is such that, even when the sequence of the data is rearranged, a significance of the data is not changed.

Geometric shape data, which are generated in three-dimensional graphics, CAD, or the like, will be taken as an example of three-dimensional image data, and explained below. Formats description of a three-dimensional shape are, for example, the following:

- Three-dimensional description scheme that is employed in, such as VRML (Virtual Reality Modeling Language) Web.
- X3D (Extensible 3D): a description format in which the VRML is integrated with XML
- DXF/DWG which is the de facto standard format for CAD
- HPGL: graphics format developed by Hewlett-Packard, or Hewlett-Packard Graphics Language
- Raw Triangle: triangle coordinates written in ASCII text FIGS. 2 and 3 show examples of formats which describe objects of three-dimensional shapes as structural data, respectively. FIG. 2 exemplifies the VRML format of a polyhedron that has 6 vertexes which is described by an xyz-coordinate system. From the viewpoint of an aspect of the present invention, the VRML format represents text data which have a data structure described by the single parameter of xyz-coordinate values. The VRML can be sequenced by the parameter value (details described later).

FIG. 3 exemplifies triangle Raw Triangle format that is similarly described in an xyz-coordinate system. In the Raw Triangle format, three points are described in xyz-coordinates and also represent one triangle.

In this manner, the "object description format" includes geometry parameters that determine the type, size, position and direction of an object.

The output unit 3 is an interface unit that outputs an object, which is embedded with watermark information and composed of a plurality of structural data.

The storage unit 4 stores therein the following header additional information:

- Information which represents a creator or a rightful person (name, some sort of ID or mail address, a URL, or the like)
- Information on software or a device which handled the data (serial No., the version information of the software, or the like)
- Information of a creation date, a data size, etc.

The data standardization process unit 5 sorts a plurality of structural data on the basis of a predetermined rule (hereinbelow, termed the "first rule").

Here, several techniques are considered as the rule which the data standardization process unit 5 employs, that is, a sorting algorithm, and the installing aspects thereof. Basically, however, the order of the structural data is changed in accordance with some sort of criterion.

Subjects to apply the sorting algorithm, that is, subjects to rearrange data are the following two:

A. To standardize the description content of the object itself

B. To standardize the stated sequence of objects within a file (stream)

Methods to be explained below are considered as practicable examples of installation concerning each of the subjects.

A. Standardization of description content of structural data constituting object 1). Regarding structural data in a format in which an object is represented as the sequential set of points as in, for example, a polygon, the significance of the object is never changed even when the sequence of the points is changed as to the point from which description is started. Accordingly, a degree of freedom exists in the sequence. Specifically, it is considered as the first rule by way of example to set the description starting point at the point which is nearest to or furthest from any predetermined reference point.

2). A data structure, such as cylinder or body of revolution has an axis, which is described by data representative of a segment. A degree of freedom similarly exists in the description content, and it is considered to describe this description content by an origin and a directional vector, or by the two points of an initial end and a terminal end.

B. Objects order

1). Objects are rearranged in the order in which they are nearer to or further from any predetermined reference point. On this occasion, the rearrangement processing is applied only to the specified coordinates of the objects. Alternatively, the rearrangement processing may well be applied to the objects subjected to coordinate transformation into a predetermined coordinate system. The coordinate system need not always to be a rectangular coordinate system.

That typical point (typical parameter value) of each object at which the distance thereof to the reference point is measured can be selected from the following examples:

- Point which first appears first in the object description
- Centroid of the object
- Point which is nearest to (or furthest from) the reference point within the object 2). Objects are rearranged in a sequence which conforms to the properties of the objects.

By way of example, objects are sorted by areas and by volumes, respectively, when they are polygon objects and objects that have volumes.

When objects have textures, any sequence is defined for data representing the textures and the objects, are sorted in accordance with the sequence. Regarding the expression "any sequence" here, the texture representing data are interpreted as, for example, numerical values so as to introduce the sequence based on the magnitudes of the numerical values, or they are interpreted as, for example, character strings so as to introduce the sequence based on the lexicographic order.

3). Objects are rearranged in a sequence which conforms to the correlations of the positions of the objects.

One object is designated, and a tree-like data structure is constructed in accordance with the distances of objects from the designated object. Thereafter, the objects are sequenced by the way of tracing the tree on the basis of any rule.

It is also considered to combine the above methods.

The standardization process in the standardization process unit 5 will now be explained using examples of the Raw Triangle.

First, a specified reference point A is defined in a three-dimensional space (Step 0).

Subsequently, all triangles are transformed into a format in which each of them is described from a point nearest to the reference point A (Step 1). Specifically, in the course of the step 1, one of the triangles is selected and distances from three points of description of the selected triangle to the reference point A are respectively computed. The description of the triangle is changed so that the point of the shortest distance may become the first, on the basis of the magnitudes of the distances of the respective points to the reference point A.

Subsequently, a specified reference point B is defined in the three-dimensional space (Step 2). The distances of all the triangles to the reference point B are respectively computed in the same manner as at the step 1 (Step 3). It is established as a rule that the distance is calculated for the first point of the description of each triangle. The triangles are rearranged in the order of shorter distances to the reference point B, on the basis of the calculated results of the distances to the reference point B (Step 4).

The standardization process based on the first rule will be explained in a simple practicable example.

Consider a triangle T1 (0,0,0, 1,0,0, 0,1,0) and a triangle T2 (0,1,0 1,1,0, 1,2,0). In representation conforming to the Raw Triangle format, the triangles are described as follows:

```
    ..............                               (Representation 1)
    000100010
    010110120
    ..............
```

Assuming by way of example that the reference point A is (10,0,0), the description of the triangles is brought into the following sequential turns by the step 1 (Standardization A):
T1 (1,0,0,0,1,0,0,0,0)
T2 (1,1,0,0,1,2,0,0,1,0)

Subsequently, assuming that the reference point B is (0,10,0), the triangle T2 is nearer to the point B, and hence, the sequential turn of the triangle T2 comes first at the step 2. After all, the Raw Triangle representation is changed from the above representation 1 to Representation 2 in which the sequential turns of the triangles T1 and T2 are rearranged as follows (Standardization B):

```
    ..............                               (Representation 2)
    110120010
    100010000
    ..............
```

The "standardization" is thus completed. Herein, if the reference points A and B are unknown, the triangles cannot be properly rearranged even when the sorting algorithm is known.

A multiplicity of variations are considered in such a manner that, regarding the computing method for the distances, the coordinate system of the triangles is transformed into, for example, a polar or a cylindrical coordinate system, whereupon distance weighting calculation is performed.

The additional information granting process unit 6 adds the following additional information stored in the storage unit 4, to the output result of the standardization process unit 5:

Information which indicates a creator or a rightful person (name, any ID or mail address, a URL, or the like)

Information on software or a device which handled the data (serial No., the version information of the software, or the like)

Information of a creation date, a data size, etc.

Common keys are given to the contents of the additional information on both the embedding side and the receiving side.

The message digest process unit 7 calculates a message digest by employing a predetermined hash function, for a bit stream which includes a plurality of structural data sorted by the data standardization process unit 5, and for a bit stream in which the additional information granting process unit 6 has further added additional information to the structural data, or only for the former bit stream.

Considered as a practicable message digest process is, for example, the MD5 standard in which, when any bit string of at least one bit is input, a bit string of fixed length (a bit pattern of 160 bits) is output.

With a key being the message digest calculated by the message digest generation device, the data transformation process unit 8 sorts a plurality of structural data sorted by the data standardization device, in conformity with a second rule that is different from the first rule.

There will be explained an example of the second rule which determines a description sequence with a starting point set at the standardized representation 2 in the foregoing example.

```
    ..............                               (Representation 2)
    110120010
    100010000
    ..............
```

It is first assumed that a message digest value of the following bit string (in the binary notation), for example, have been obtained when a message digest process is executed for a bit stream, which includes a plurality of standardized structural data, and a bit stream in which the additional information granting process unit 6 has further added additional information to the structural data:
111010011010001111000011010101000111 . . .

Using the bit string, the description of the representation 2 is transformed.

A. Transformation of Description sequence of Vertexes of Individual triangles

First, every 2 bits of the above bit string are acquired from the beginning thereof. In this case, four kinds of combinations are considered because of the 2 bits.

When T1$a$, T1$b$ and T1$c$ denote the 3 standardized vertexes of the first triangle T1, the vertexes shall be rearranged in accordance with the obtained bits, as follows:
00: T1$a$,T1$b$,T1$c$
01: T1$b$,T1$c$,T1$a$
10: T1$c$,T1$a$,T1$b$
11: T1$a$,T1$b$,T1$c$ The 2 bits at the head of the message digest value are "11", and this rearrangement is held intact. The next 2 bits are "10", and the description sequence of vertexes is changed into the order of (c,a,b) for the second triangle.

B. Rearrangement of Triangles themselves

Subsequently, the sequential turns of objects (in the explanation here, the two triangles) are determined. Incidentally, seven objects A, B, C, D, E, F and G will be considered as a more appropriate example in the ensuing description. However, the description is quite similarly applicable to the case of the two triangles, and the present invention shall not be restricted by the mere example.

Specifically, the continuation of the bit stream resulting from the message digest process is now "100110", and it will be considered to successively use the bits of the continuation from the leftmost one.

Outset: [A]BCDEFG

Since the head object A has a head bit of "1", it is replaced with the adjacent object B. The object which is a subject for a replacement operation is enclosed in [ ].

[1]: B[A]CDEFG

The next bit is "0", and the object being the subject for the operation is set at the adjacent object C without replacing the object A with the adjacent object this time.

[2]: BA[C]DEFG

Since the next bit is also "0", the further adjacent object D is set as the subject for the operation.

[3]: BAC[D]EFG

Since the next bit is "1", the object D is replaced with the adjacent object E.

[4]: BACE[D]FG

Further, since the next bit is "1", the object D is replaced with the adjacent object F, also.

[5]: BACEF[D]G

Since the last bit is "0", the rearrangement is ended.

[6]: BACEFDG

The rearrangement process which is executed on the basis of the message digest value by the data transformation process unit 8 is thus completed and the structural data submitted to the rearrangement process is delivered to the output unit 3.

In this way, the description sequence of objects can be uniquely determined in accordance with a bit string outputted by a message digest function.

Figure 4:
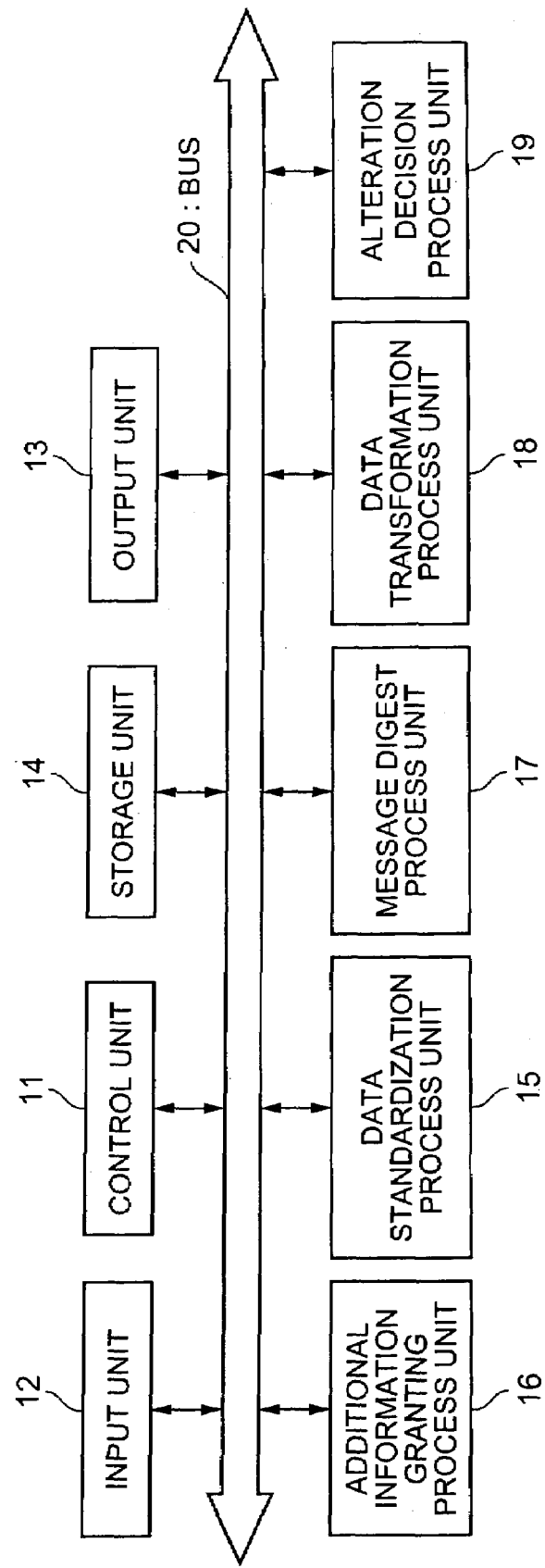
FIG. 4 is a block schematic showing the construction of an information alteration detection apparatus in this an embodiment.

FIG. 4 is a block schematic showing the construction of the information alteration detection apparatus in this exemplary embodiment.

The information alteration detection apparatus in this exemplary embodiment is so constructed that a control unit 11, an input unit 12, an output unit 13, a storage unit 14, a data standardization process unit 15, an additional information granting process unit 16, a message digest process unit 17, a data transformation process unit 18, and an alteration decision process unit 19 are interconnected by a bus 20.

The control unit 11 controls data input/output in the input unit 12, the output unit 13, the storage unit 14, the data standardization process unit 15, the additional information granting process unit 16, the message digest process unit 17, the data transformation process unit 18 and the alteration decision process unit 19.

The input unit 12 is an interface unit which inputs an object composed of a plurality of structural data with watermark information embedded therein by the embedded information apparatus.

The output unit 13 is an interface unit that outputs the result of a decision on the presence or absence of any alteration (described later) as rendered by the alteration decision process unit 19.

The storage unit 14 stores therein the same additional information as in the storage unit 4 of the embedded information apparatus, by employing common keys.

The data standardization process unit 15, as well as to the data standardization process unit 5, sorts a plurality of structural data inputted to the input unit 12, on the basis of the first rule stated above.

The additional information granting process unit 16, as well as the additional information granting process unit 6 of the embedded information apparatus, adds the additional information stored in the storage unit 14, to the output result of the standardization process unit 15.

The message digest process unit 17 calculates a message digest by employing a predetermined hash function, for a bit stream which includes a plurality of structural data sorted by the data standardization unit 15.

With a key being the message digest calculated by the message digest generation process unit 17, the data transformation process unit 18, as well as the data transformation process unit 8, sorts a plurality of structural data which has been sorted by the data standardization process unit 15, and the plurality of structural data on which additional information has been further granted by the additional information granting process unit 16, in conformity with the second rule stated above.

The alteration decision process unit 19 compares a plurality of structural data, which is transformed, by the data transformation process unit 18, with a plurality of structural data, before being sorted by the data standardization process unit 15. If the two kinds of structural data agree, the alteration decision process unit 19 renders the decision that the plurality of structural data before being sorted by the data standardization process unit 15, namely, the plurality of inputted structural data, have not been altered. In contrast, if the two kinds of structural data do not agree, the unit 19 renders the decision that the plurality of structural data before being sorted by the data standardization device have been altered.

Regarding a case where the plurality of structural data that is transformed by the data transformation process unit 18 bear the additional data bestowed before the data transformation, if the two kinds of structural data agree, the alteration decision process unit 19 renders the decision that the additional data have not been altered, either. However, if the two kinds of structural data do not agree, the unit 19 renders the decision that the plurality of structural data before being sorted by the data standardization device or/and the additional data have been altered.

Figure 5:
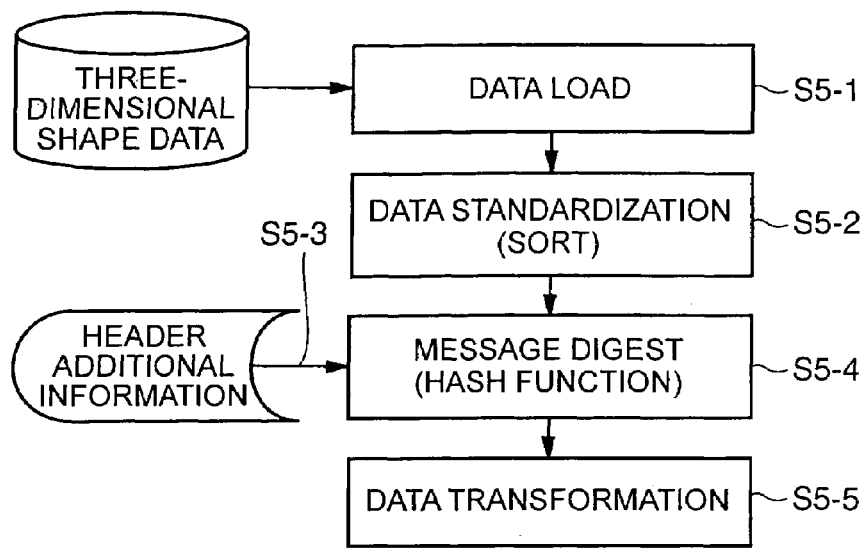
FIG. 5 is a flow chart showing the course of an embedded information process based on an originality guarantee system in an exemplary embodiment.
Figure 6:
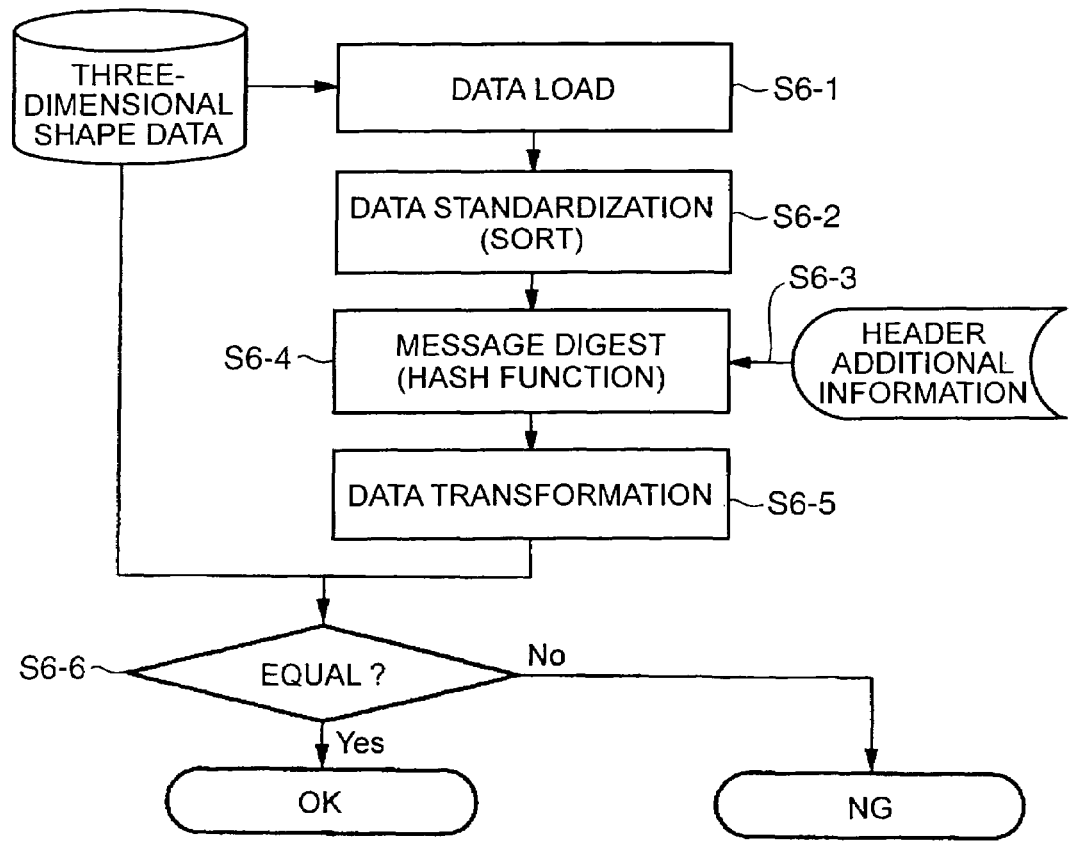
FIG. 6 is a flow chart showing the course of an information alteration detection process.

Next, the operation of a data providing system in this exemplary embodiment will be described with reference to the drawings. FIG. 5 is a flow chart showing the course of an embedded information process which is based on an originality guarantee system in this exemplary embodiment. Besides, FIG. 6 is a flow chart showing the course of an information alteration detection process which follows the embedded information process.

As the embedded information process, in the embedded information apparatus, the data of a three-dimensional shape model, which is a set of objects composed of a plurality of structural data are first prepared (Step 5-1). When the data of the three-dimensional shape model are inputted to the input unit 2, the data standardization process unit 5 sorts the data in conformity with the predetermined first rule so as to transform them into a standard data representation format (Step 5-2).

Subsequently, the additional information granting process unit 6 bestows header information and additional information, such as common keys, on the data of the three-dimensional shape model transformed into the standard data representation format (Step 5-3).

Subsequently, the message digest process unit 7 executes a message digest process for all or some of the additional information and the data of the three-dimensional shape model that is standardized, thereby obtaining a message digest value (Step 5-4).

The data transformation process unit 8 transforms the representation of the standard data format on the basis of the second rule in accordance with the bit stream of the message digest value (Step 5-5).

The embedded information process is thus completed.

Next, as the information alteration detection process, in the information alteration detection apparatus, the data of a three-dimensional shape model, in which information is thought to be embedded, are prepared (Step 6-1). When the data of the three-dimensional shape model are input to the input unit 12, the data standardization process unit 15, as well as the data standardization process unit 5, sorts the data in conformity with the predetermined first rule so as to transform them into a standard data representation format (Step 6-2).

Subsequently, the additional information granting process unit 16, as well as the additional information granting process unit 6, bestows header information and additional information, such as header information and common keys, on the data of the three-dimensional shape model transformed into the standard data representation format (Step 6-3).

Subsequently, the message digest process unit 17, as well as the message digest process unit 7, executes a message digest process for all or some of the additional information and the data of the three-dimensional shape model submitted to the standardization process, thereby obtaining a message digest value (Step 6-4).

The data transformation process unit 18, as well as the message digest process unit 7, transforms the representation of the standard data format on the basis of the second rule in accordance with the bit stream of the message digest value (Step 6-5).

The alteration decision process unit 19 compares a plurality of structural data that is transformed by the data transformation process unit 18, with a plurality of structural data before being sorted by the data standardization process unit 15 (Step 6-6). If the two kinds of structural data agree, the alteration decision process unit 19 renders the decision that the plurality of structural data, before being sorted by the data standardization process unit 15, namely, the plurality of inputted structural data, have not been altered. However, if the two kinds of structural data do not agree, the unit 19 renders the decision that the plurality of structural data, before being sorted by the data standardization device, have been altered.

Regarding a case where the plurality of structural data submitted to the data transformation by the data transformation process unit 18 bear the additional data bestowed before the data transformation, if the two kinds of structural data agree, the alteration decision process unit 19 renders the decision that the additional data have not been altered, either. However, if the two kinds of structural data do not match, the unit 19 renders the decision that the plurality of structural data, before being sorted by the data standardization means or/and the additional data, have been altered.

Accordingly, the originality guarantee system in this exemplary embodiment changes the description method of objects with the hashed value of any data used as a key, by utilizing the principle of originality guarantee, so as to embed information in "redundancy" representing the data, that is, in the description sequence of the objects. It is therefore embedding the information without changing any "significance" and "quality" of the represented data. The information is not explicitly embedded, but the structure of the data is significant. In case of any alteration, the appropriate structure changes, so that the system can advantageously detect the alteration.

An example of the more detailed operation of the data providing system in this exemplary embodiment will be explained below. Consider the case of a set in which objects (primitives) are triangles. The explanation is similarly applicable even to general polygons or bodies of revolution or a geometric model represented by any mathematical model.

Assuming that triangles T1–T100 shows the vertexes of each triangle are denoted as, for example, T1(T1_a, T1_b, T1_c). Here, $T1_{13}$ a, etc. represent three-dimensional vectors.

The sequence in which the triangles T1 to T100 are described is redundant in a data structure, and the sequence in which the vertexes ($Ti_{13}$ a, Ti_b, Ti_c) are described are redundant in the triangle Ti. First, any reference point A is considered, and the triangles are sorted in the order in which the centroidal vectors of the individual triangles are nearer to the reference point A.

Further, regarding which of the three vertexes of each triangle is to be first described, a description method for each individual triangle is standardized by such a technique that an apex having the shortest distance to any reference point B is set as an origin.

Thus, the data are standardized.

Subsequently, a bit string of specified length is obtained from additional information (stated in a header) or any secret bit string which is added to this data, the standardized data themselves, and the combination of them, by employing a message digest function.

Since three sorts of sequences are considered to state the three vertexes of each triangle, which of the vertexes is to be first described is determined for, for example, every message digest bits. In this way, the representation of the standardized data is transformed.

Here, the coordinates of the reference points A and B, a processing method to compute a message digest, the kind of data which are used in computing the digest, etc. are kept secret, whereby illegal data transformation can be reduced or prevented in case of any alteration.

Each of the embedded information apparatus and the information alteration detection apparatus explained above includes a computer system therein.

The course of the series of processing steps concerning each of the embedded information and the information alteration detection explained above is stored in the form of a program in a computer-readable record medium, and the program is read out and run by a computer, thereby to execute the process.

That is, the processing device or processing units in each of the embedded information apparatus and the information alteration detection apparatus are realized such that a central processing apparatus, such as CPU, reads out the above program on a main storage, such as ROM or RAM, and executes the arithmetic processing of information.

Here, the "computer-readable record medium" signifies a magnetic disk, a magnetooptical disk, a CD-ROM, a DVD-ROM, a semiconductor memory, or the like. Besides, the computer program may well be distributed to a computer through a communication line so as to be run by the computer.

What is claimed is:

1. An originality guarantee system, comprising:
    an embedded information apparatus which embeds information into a plurality of structural data including:
        a first data standardization device that sorts the plurality of structural data on the basis of a first rule,
        a first message digest generation device that calculates a message digest with a predetermined hash function, for a bit stream composed of the plurality of structural data sorted by the first data standardization device, and
        a first data transformation device that sorts the plurality of structural data sorted by the first data standardization device on the basis of a second rule that is different from the first rule, with a key being the message digest calculated by the first message digest generation device;
    an information alteration detection apparatus which detects any alteration of the plurality of structural data with the information that is embedded by the embedded information apparatus including:
        a second data standardization device that sorts a plurality of structural data on the basis of the first rule,
        a second message digest generation device that calculates a message digest with the hash function, for a bit stream composed of the plurality of structural data that is sorted by the second data standardization devices,
        a second data transformation device that sorts the plurality of structural data sorted by the second data standardization device on the basis of the second rule, with a key being the message digest calculated by the second message digest generation device; and
        a decision device that:
            compares the plurality of structural data, which is sorted by the second data transformation device, with the plurality of structural data before being sorted by the second data standardization device,
            decides the plurality of structural data, before being sorted by the second data standardization device, have not been altered when both of the structural data match, and
            decides the plurality of structural data, before being sorted by the second data standardization device, have been altered when both of the structural data do not match.

2. An information alteration detection apparatus, comprising:
    a data standardization device that sorts a plurality of structural data on the basis of a first rule being the same as that of a data standardization device of an embedded information apparatus;
    a second message digest generation device that calculates a message digest with a predetermined hash function, for a bit stream composed of the plurality of structural data sorted by the data standardization device;
    a data transformation device that sorts the plurality of structural data sorted by the data standardization device, on the basis of a rule that is different from the first rule and is the same as that of data transformation device of the embedded information apparatus, with a key being the message digest calculated by the message digest generation device; and
    a decision device that:
        compares the plurality of structural data sorted by the data transformation device with the plurality of structural data before being sorted by the data standardization device,
        decides the plurality of structural data, before being sorted by the data standardization device, have not been altered when both of the structural data match, and
        decides the plurality of structural data, before being sorted by the data standardization device, have been altered when both of the structural data do not match.

3. An embedded information and information alteration detection method, comprising:
    sorting a plurality of structural data on the basis of a first rule;
    calculating a message digest with a predetermined hash function, for a bit stream composed of the plurality of sorted structural data;
    sorting the plurality of sorted structural data on the basis of a rule that is different from the first rule by using the calculated message digest as a key; and
    comparing the plurality of structural data, which is sorted on the basis of the second rule, with the plurality of structural data, before being sorted on the basis of the first rule, and deciding the plurality of structural data, before being sorted on the basis of the first rule, have not been altered when both of the structural data match, and deciding the plurality of structural data, before being sorted on the basis of the first rule, have been altered when both of the structural data do not match.

4. A computer-readable record medium being executable that stores and executes an embedded information and information alteration detection program on a computer, comprising:
    sorting a plurality of structural data on the basis of a first rule;
    calculating a message digest with a predetermined hash function, for a bit stream composed of the plurality of sorted structural data;
    sorting the plurality of sorted structural data on the basis of a rule that is different from the first rule by using the calculated message digest as a key; and
    comparing the plurality of structural data, which is sorted on the basis of the second rule, with the plurality of structural data, before being sorted on the basis of the first rule, and deciding the plurality of structural data, before being sorted on the basis of the first rule, have not been altered when both of the structural data match, and deciding the plurality of structural data, before being sorted on the basis of the first rule, have been altered when both of the structural data do not match.

* * * * *